(12) United States Patent
Thetford et al.

(10) Patent No.: US 6,787,628 B2
(45) Date of Patent: Sep. 7, 2004

(54) POLYETHER/POLYURETHANE ASSOCIATION THICKENERS

(75) Inventors: Dean Thetford, Blackey (GB); Stuart Barnett, Blackey (GB)

(73) Assignee: Avecia Limited, Manchester (GB)

( * ) Notice: Subject to any disclaimer, the term of this patent is extended or adjusted under 35 U.S.C. 154(b) by 0 days.

(21) Appl. No.: 10/398,166

(22) PCT Filed: Oct. 17, 2001

(86) PCT No.: PCT/GB01/04650

§ 371 (c)(1),
(2), (4) Date: Apr. 2, 2003

(87) PCT Pub. No.: WO02/38645

PCT Pub. Date: May 16, 2002

(65) Prior Publication Data

US 2004/0007153 A1 Jan. 15, 2004

(30) Foreign Application Priority Data

Nov. 8, 2000 (GB) .............................................. 0027216

(51) Int. Cl.$^7$ ............................................... C08G 18/48

(52) U.S. Cl. .............................. 528/76; 528/77; 528/49; 528/83

(58) Field of Search ............................. 528/83, 49, 76, 528/77

(56) References Cited

U.S. PATENT DOCUMENTS

| | | | |
|---|---|---|---|
| 4,426,485 A | 1/1984 | Hoy et al. | 524/591 |
| 4,661,275 A | 4/1987 | Forsberg et al. | 252/49.3 |
| 4,770,804 A | 9/1988 | Hentschel et al. | 252/75 |

FOREIGN PATENT DOCUMENTS

EP 0 307 775 3/1989

*Primary Examiner*—Rachel Gorr
(74) *Attorney, Agent, or Firm*—Morgan, Lewis & Bockius LLP

(57) ABSTRACT

A polymer comprising the addition reaction product of a polyisocyanate having a functionality of from 2 to 10 and a succinylpolyether having a $C_{6-30}$-alk(en)yl group and at least one group which is capable of reacting with the polyisocyanate and where the number of recurring ethyleneoxy groups in the polyether is from 4 to 800.

11 Claims, No Drawings

POLYETHER/POLYURETHANE ASSOCIATION THICKENERS

The present invention relates to polymers comprising polyether chains having a hydrophobic side chain which are linked by urethane and/or amide groups and their use as "Association Thickeners" in polar media such as paints and inks, including inks for non-contact printing processes such as Drop-on-Demand inkjet printing. Many of these polymers are believed to function according to "Micellar Bridging" theory.

The terms "Association Thickener" and "Micellar Bridging" theory are explained in U.S. Pat. No. 4,426,485 and refer to the manner in which the hydrophobic parts (hereinafter hydrophobe) of a water-soluble thickener are absorbed by a solute particle such as a latex particle to provide a network of low molecular weight thickener molecules giving good flow and levelling characteristics to water-borne coatings and latex systems under high shear conditions.

Association Thickeners are thickeners which function by Micellar Bridging theory and generally contain hydrophobes which are spaced either randomly or in clusters along a hydrophilic, especially water-soluble, polymer backbone. Polyester Association Thickeners have been proposed which are obtained by polymerising a polyethylene glycol chain attached to a moiety containing a hydrophobe but these can exhibit storage deficiencies when used in strongly alkaline latices and/or latices which contain primary amines. It has now been found that improved storage properties can be obtained where the repeat units are connected via urethane and/or amide groups.

According to the invention there is provided a polymer comprising the addition reaction product of a polyisocyanate having a functionality of from 2 to 10 and a succinyl polyether having a $C_{6-30}$-alk(en)yl group and at least one group which is capable of reacting with the polyisocyanate.

The polyisocyanate may be aliphatic, cyclo-aliphatic or aromatic, including mixtures thereof. Examples of suitable polyisocyanates are 1,4-tetramethylene diisocyanate, 1,6-hexamethylene diisocyanate (HDI), 2,2,4-trimethyl-1,6-diisocyanatohexane, 1,10-decamethylenediisocyanate, 1,4-cyclohexylenediisocyanate, 4,4¹-methylenebis(isocyanatocyclohexane), 1-isocyanato-3-isocyanatomethyl-3,5,5-trimethylcyclohexane, m- and p-phenylenediisocyanate, 2,6-and 2,4-tolylenediisocyanate (TDI), xylenediisocyanate, 4-chloro-1,3-phenylenediisocyanate, 4,4¹-biphenyleneisocyanate, 4,4¹-methylenediphenylisocyanate(MDI), isophorone diisocyanate, 1,5-naphthylene diisocyanate, 1,5-tetrahydronaphthylene diisocyanate; polymethylene polyphenylisocyanates sold under the brand name "PAPI" such as "PAPI 135" (equivalent weight of 133.5 and average isocyanate functionality of 2.7) and "PAPI 901" (equivalent weight of 133 and average isocyanate functionality of 2.3); aromatic triisocyanate adduct of trimethylolpropane and TDI sold under the trade name "Mondur CB-75" aliphatic tri-isocyanates such as the hydrolytic trimerisation product of 1,6-hexamethylenediisocyanate sold as "Desmodur N"; and $C_{36}$-dimer acid diisocyanate sold as "DDI" as disclosed in J. Am. Oil Chem. Soc. 51,522 (1974).

Other polyfunctional polyisocyanates are those obtainable by the addition reaction of diisocyanates and polyols such as

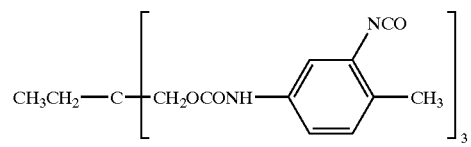

or those obtainable from di-isocyanates by the biuret reaction, such as

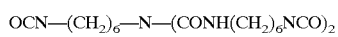

or polyisocyanates obtainable by the cyclisation of di-isocyanates such as

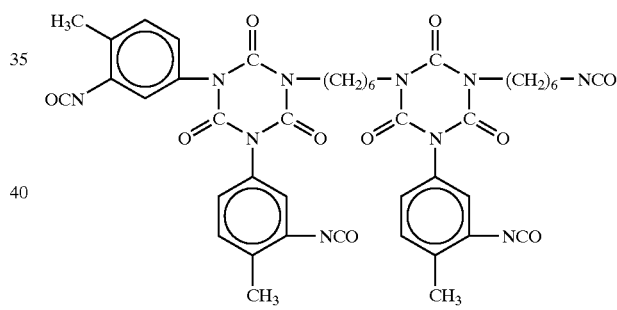

Trade product: Desmodur HL (registered Trade Mark)

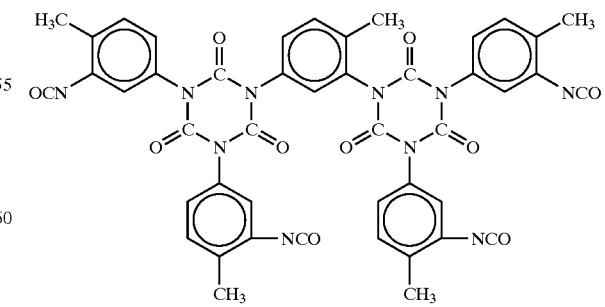

Trade product: Desmodur IL (registered Trade Mark)

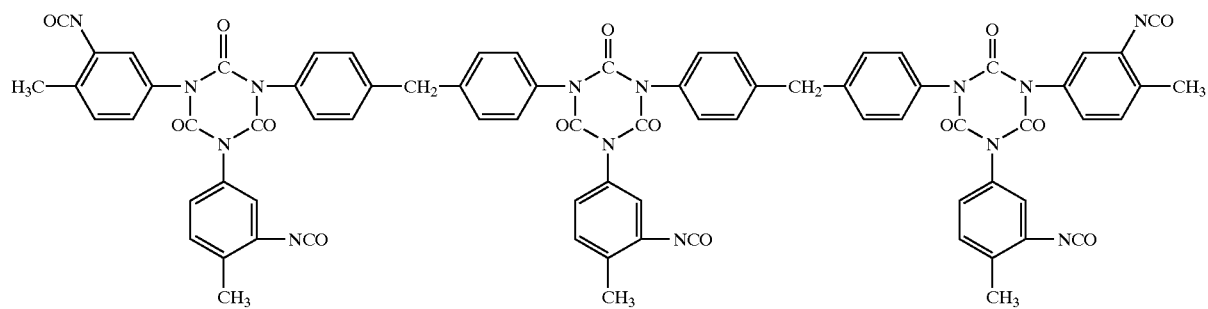

Trade product: Polurene KC (registered Trade Mark)

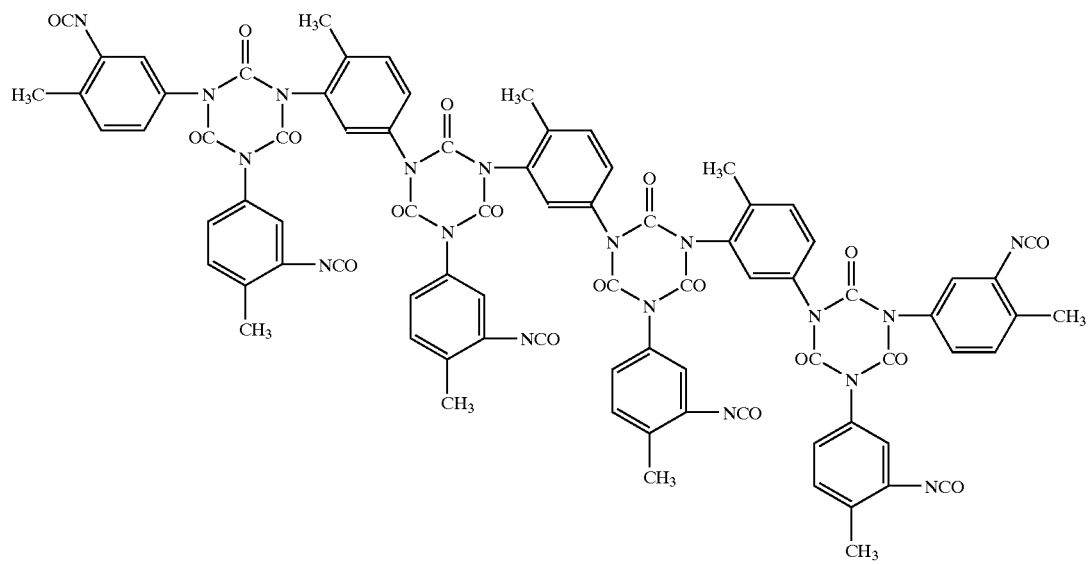

Trade product: Polurene HR (registered Trade Mark)

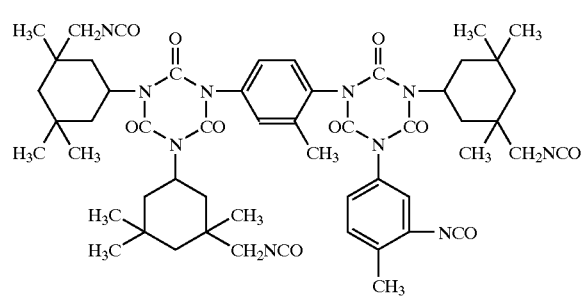

Tolylene diisocyanate-isophorone diisocyanate-isocyanurate Company: SAPICI)

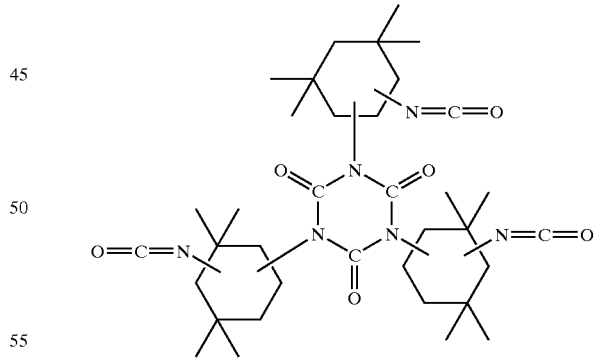

Trimeric isophoronediisocyanate (isocyanurate-T1890 of Chemische Werke Huls)

Further examples of polyisocyanates available as commercial products include Desmodur VL (polyisocyanate based on diphenylmethane diisocyanate (MDI) from Bayer), Desmodur A 4370 (polyisocyanate based on isophorone diisocyanate (IPDI) from Bayer), Polurene KD (polyisocyanate based on toluene diisocyanate (TDI) from SAPICI), Uronal RA.50 (polyisocyanate based on TDI from Galstaff), Polurene A (polyisocyanate based on TDI-trimethylol propane (TMP) from SAPICI), Polurene MC (polyisocyanate based on TMP-IPDI from SAPICI), Polurene MD.70 (polyisocyanate based on TMP-TDI-MDI from SAPICI.

Many of the polyisocyanates are commercially available as mixtures. The term "average functionality" means the statistical average number of free isocyanate groups in the polyisocyanate and is the ratio of average molecular weight of the polyisocyanate and the isocyanate equivalent weight taking into account the number of isocyanate groups.

Preferably, the polyisocyanate has a functionality of from 2 to 6.

The succinyl polyether is obtainable by reacting a polyether having at least one amino or hydroxy group with a $C_{6-30}$-alk(en)ylsuccinic anhydride.

The polyether is preferably derivable from ethylene oxide, propylene oxide or butylene oxide or it may be derivable from polymerised tetrahydrofuran, including mixtures thereof. It is, however, preferred that the polyether is derivable from ethylene oxide and/or propyleneoxide. Polyethers derivable from ethylene oxide are much preferred. The number of recurring alkyleneoxy groups in the succinyl polyether is preferably from 4 to 800, more preferably from 4 to 500 and especially from 4 to 300.

The polyether may be a polyalkyleneglycol, a polyalkyleneglycol mono alkyl ether, a polyalkyleneglycol mono amine, a polyalkyleneglycol mono alkyl ether mono amine or a polyalkyleneglycol diamine.

When the polyether is a mono alkyl ether, the alkyl group preferably contains not greater than 30 carbon atoms, more preferably not greater than 20 carbon atoms, even more preferably not greater than 10 carbon atoms and especially not greater than 6 carbon atoms. The alkyl group may be linear or branched. Useful thickeners have been obtained when the polyether is a mono methyl ether.

It is much preferred that the polyether is difunctional. Examples of difunctional polyethers are polyalkyleneglycols, more preferably polyalkyleneglycol mono amines and especially polyalkyleneglycol diamines.

Examples of polyalkyleneglycols are polyethyleneglycols such as PEG 200, PEG 1500, PEG 2000, PEG 3000, PEG 4000, PEG 6000, PEG 8000, PEG 10000, PEG 12000 and PEG 35000, wherein the numbers indicate the approximate number average molecular weight.

Examples of mixed chain polyalkyleneglycols are the EO/PO/EO block copolymers such as those which are commercially available as Synperonic polymers from Uniqema and the PO/EO/PO block co polymers which are available as Pluronic polymers from BASF.

Examples of polyalkylene glycol mono alkyl ethers are MeO PEG 350, 550, 750, 2000 and 5000 (ex Aldrich) and "BuO PPG 340, 1000, 1200, 2500, and 4000 (ex Aldrich).

Other examples of polyalkyleneglycol mono alkyl ethers are Brij 35 (EO (23) end-capped by dodecanol), Brij 97 (EO(10) end-capped by oleyl alcohol), Brij 78 (EO(20) end-capped by stearyl alcohol) and Brij 700 (EO(100) end-capped by stearyl alcohol). The Brij surfactants are available from ICI Inc.

Examples of polyalkyleneglycol mono alkyl mono amines are the so called Jeffamine M series of polyethers available from Huntsman Corporation. Specific examples are Jeffamine M-1000 (MeO EO (19) PO (3) amine), M-600 (MeO EO (1) PO (9) amine), M-2070 (MeO EO (32) PO (10)amine), M-2005 (MeO EO (6) PO(39) and M-3003 (MeO EO (49) PO (8) amine). MeO represents a methoxy terminated polyether, EO represents repeat ethylene oxide units and PO represents repeat propyleneoxide units and the numbers in parentheses represent the approximate number of repeat units.

Examples of polyalkyleneglycol diamines are the so-called Jeffamine D-series of polyether diamines which are amine terminated polypropyleneglycols of formula

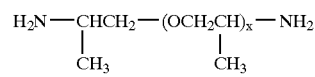

Specified examples are Jeffamine D-230 (x=2-3), D-400 (x=5-6), D-2000 (x=33 average) and D-4000 (x=68 average).

Other examples of polyalkyleneglycol diamines are the Jeffamine ED-series of polyether diamines which are based predominantly on a polyethyleneoxide backbone and of formula

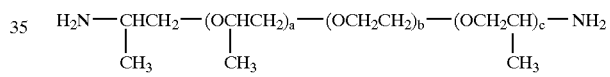

Specific examples are Jeffamine ED 600 (b=8.5, a+c=2.5), ED-900 (b=15.5, a+c=2.5), ED 2001 (b=40.5, a+c=2.5) ED-400 (b=86, a+c=2.5).

The succinyl polyether having a $C_{6-30}$-alk(en)yl group is obtainable by reacting an alk(en)yl succinic anhydride (hereinafter ASA) with a polyether having at least one hydroxy or amino group. Examples of suitable succinic anhydrides are 2-octenyl, n-octadecenyl, n-decyl, n-decenyl, n-tetradecyl, n-hexadecyl, n-octadecyl, dodecenyl and polyisobutylene succinic anhydrides.

It is preferred that the alk(en)yl group contains not less than 8 and especially not less than 12 carbon atoms and preferably not greater than 24 and especially not greater than 20 carbon atoms.

Preferably the succinyl polyester contains a $C_{6-30}$-alkyl group.

When the succinyl derivative is reacted with a polyether containing one or more hydroxy functional groups, the succinyl moiety is attached to the polyether via an ester group(s). When the succinyl derivative is attached to the polyether having one or more amino functional groups, the succinyl moiety is attached to the polyester via an amide or cyclic amide group(s) depending on the reaction conditions.

When the succinyl polyether is derived from a difunctional polyether such as a polyalkyleneglycol, a polyalkyleneglycol mono amine or a polyalkyeneglycol diamine the terminal carboxylic acid group of the succinyl polyether may be further reacted with an aliphatic alcohol or aliphatic amine. Preferably the aliphatic amine or alcohol contains a $C_{6-30}$-alkyl group, more preferably a $C_{8-24}$-alkyl group and especially a $C_{8-20}$-alkyl group. The alkyl group may be linear or branched.

Examples of suitable aliphatic amines and alcohols are propylamine, n-butylamine, tert-butylamine, n-octylamine, tert-octylamine, n-decylamine, n-dodecylamine, n-octadecylaine and the polyalkylene glycol monoalkyl monoamines disclosed hereinbefore; n-propanol, tert-butanol, n-octanol, n-decanol, n-dodecanol, stearyl alcohol, the so-called Guerbet alcohols such as Isofol 12, 14T, 16, 18T, 18E, 20, 24, 28, 32, 32T and 36 (ex Condea GmbH); and polyalkyleneglycol mono alkyl monoamines and polyalkylene glycol diamines as disclosed hereinbefore.

The succinyl polyether having a terminal carboxy or isocyanate group may also be reacted with diols, diamines and/or hydroxy amines. The diol, diamine or hydroxyamine may react with the succinyl polyether to provide an Association Thickener having a free amine or hydroxy group or it may react with the two different succinyl polyether chains as a cross-linking agent. Examples of suitable diols, diamines and hydroxyamines are ethyleneglycol, polyalkylene glycols and polyalkylene glycol diamines as disclosed hereinbefore.

When the polyether is monofunctional, the ASA and polyether are preferably reacted together in stoichiometrical amounts. However, when the polyether is difunctional the ASA and polyether may be reacted together in a ratio of from 2:1 to 1:2 depending whether a succinyl polyether is required having two carboxylic acid functional groups or whether a succinyl polyether is required having two amino or two hydroxy groups. It is, however, preferred to react the ASA and difunctional polyether together in a stoichiometric ratio so that the resultant succinyl polyether contains both a carboxylic acid group and an amino or hydroxy group.

The reaction between the ASA and polyether is generally carried out in an inert atmosphere and at a temperature of from 100 to 250° C. and preferably in the presence of a catalyst such as 4-N,N-dimethylamino pyridine. The inert atmosphere may be provided by any of the inert gases of Group VIII of the Periodic Table but is preferably nitrogen.

When it is desirable to esterify or amidate a carboxy functional group of a succinyl polyether the reaction involving an aliphatic amine or aliphatic alcohol may be carried out under similar conditions to those employed when reacting the ASA with the polyether. The esterification of a carboxy functional group of a succinyl polyether is preferably carried out in the presence of an esterification catalyst such as zirconium n-butylate.

The polymers according to the invention are obtainable by reacting one or more polyisocyanates having a functionality of from 2 to 10 with one or more succinyl polyethers which may be the same or different.

When the succinyl polyether is monofunctional it is preferred that the polyisocyanate has a functionality of not less than 3 and especially not less than 4.

However, as noted hereinbefore it is preferred that the succinyl polyether is difunctional so that the resultant polymer contains repeat segments of a succinyl polyether carrying an alk(en)yl hydrophobe connected together by polyisocyanate groups.

In one preferred aspect of the invention, the difunctional succinyl polyether is reacted in stoichiometric equivalent amounts based on the number of isocyanate groups in the polyisocyanate.

However, it will be readily appreciated that a less than equivalent amount of succinyl polyethers may be employed and residual isocyanate groups may be reacted with bifunctional cross-linking agents such as diols, diamines and hydroxyamines to give a polymer containing "clustered" segments of succinyl polyether groups carrying the hydrophobe. The diols, diamines and hydroxy amines are preferably polyethers as defined hereinbefore.

Polymers containing "clustered" segments of succinyl polyether groups carrying the hydrophobe are also obtainable where the polymer formed by the addition reaction of the succinyl polyether and polyisocyanate contains unreacted hydroxy and/or amino groups since these may also be reacted with additional diols, diamines and hydroxy amines in the presence of polyisocyanate.

Polymers containing "clustered" segments of succinyl polyether groups carrying the hydrophobe are also obtainable where the polymer formed by the addition reaction of the succinyl polyether and polyisocyanate contains unreacted carboxylic acid groups since these may be reacted with additional diols and diamines optionally in the presence of polyisocyanate. Preferred diols and diamines are $C_{2-10}$-alkylene diols and diamines and polyalkylene glycols and polyalkylene glycol diamines.

The reaction between the succinylpolyether and the polyisocyanate may be affected by any means known to the art such as heating the reactants together at a temperature from 40° C. to 100° C. in an inert atmosphere optionally in the presence of an organic liquid and preferably in the presence of a catalyst. Preferred catalysts are organo-tin complexes such as dibutyltindilaurate. Preferably the inert atmosphere is provided by the inert gases of the Periodic Table or preferably by nitrogen.

The organic liquid may be polar or non-polar, including mixtures thereof. Preferred non-polar organic liquids are aromatic hydrocarbons such as toluene and xylene and esters such as ethylacetate.

For maximum Association Thickening effect in aqueous latices it is preferred that the number average molecular weight of the polymer is from 10,000 to 100,000. Preferably the molecular weight is not less than 20,000 and especially not less than 30,000. It is also preferred that the molecular weight is not greater than 60,000 and especially not greater than 50,000.

Any unreacted isocyanate groups which remain in the final polymer are removed by reaction with a lower aliphatic alcohol such as propan-2-ol or n-butanol.

As disclosed hereinbefore, the polymers according to the invention have utility as Association Thickeners in polar media, and especially in aqueous systems. They may be used to thicken aqueous dispersions or emulsions of latices, especially acrylic latices. They may also be used to thicken aqueous dispersions of particulate solids, millbases, paints and inks, including inks for non-contact printing such as ink jet printing. The amount of thickener in the dispersion, emulsion, paint or ink is generally less that 5%, preferably less than 3% and especially less than 1% based on the total amount of the formulation.

The invention is further illustrated by the following non-limiting examples wherein all references are to parts by weight unless expressed to the contrary.

EXAMPLE 1 (PEG 8000/$C_{18}$-ASA) (1:1) TDI

Random Hydrophobes

Polyethyleneglycol of average molecular weight 8000 (100 parts, 0.0125M ex Fluka) and n-octadecyl succinic anhydride (4.4 parts, 0.0125M ex TCI) were stirred under nitrogen at 200° C. for 2 hours in the presence of 4-N,N-dimethylaminopyridine (0.1 parts ex Aldrich). The resultant succinylpolyether had an Acid Value of 8.01 mg KOH/g.

The succinyl polyether was then cooled to 60° C. when tolylene-2, 4-diisocyanate (1.81 parts, 0.01M ex Aldrich) and dibutyltindilaurate (0.04 part ex Aldrich) were added. The reactants were stirred at 60° C. for 3¼ hours whereupon the resultant polymer became very viscous. The polymer had an Acid Value of 4.24 mg KOH/g which on cooling gave a yellow white solid. This is Thickener 1.

EXAMPLE 2 (PEO amine 6000/$C_{16}$-ASA) (1:1) Des IL

Random Hydrophobes

Polyethyleneglycoldiamine of average molecular weight 6000 (25 parts, 4.16 mM ex Kawaken FCC) and n-hexadecylsuccinic anhydride (1.35 parts, 4.16 mM ex TCI) were stirred under nitrogen for 18 hours at 200° C. in the presence of 4-N,N-dimethylaminopyridine (0.02 parts ex Aldrich). The resultant succinylpolyether was cooled to 75° C. and toluene (85 parts) was added. Dibutyltindilaurate (0.02 parts ex Aldrich) was then added to the solution of succinyl polyether in toluene followed by the dropwise addition of a solution of polyisocyanate (1.77 parts, 1.04 mM as Desmodur IL ex Bayer as a 51% w/w solution in ethylacetate) diluted with toluene (25 parts). The reaction was continued by stirring at 75° C. for 2½ hours under nitrogen whereupon no free isocyanate groups could be detected. After cooling, the solvent was removed under vacuum and the polymer was obtained as a pale orange solid. This was ground and remaining solvent was removed under vacuum. This is Thickener 2.

EXAMPLE 3 (PEG 10000/$C_{18}$-ASA/$C_{18}$-OH) (1:1) Des L

Random Hydrophobes

Polyethyleneglycol of average molecular weight 10000 (200 parts, 0.02M, PEG 10000 ex Fluka) and n-octadecylsuccinic anhydride (7.04 parts, 0.02 M ex TCI) were stirred at 200° C. under nitrogen for 2 hours in the presence of 4-N,N-dimethyl aminopyridine (0.2 part ex Aldrich). n-Octadecanol (5.41 parts, 0.02 M ex Aldrich) was added together with zirconium-n-butylate (1 part ex Fluorochem) and the reaction was continued by stirring under nitrogen for a further 2 hours at 200° C. The resultant succinylpolyether had zero Acid Value indicating that all the carboxylic acid groups had been esterified.

The succinylpolyether was cooled to 75° C. and toluene (500 parts) was added followed by the dropwise addition of polyisocyanate (5.83 parts, 0.0066M (6.66 mM) Desmodur L ex Bayer as a 75% solution in ethylacetate) diluted with toluene (25 parts). The reaction was continued by stirring for 3 hours at 75° C. under nitrogen whereupon the reactants were cooled and the solvent removed under vacuum. The polymer was ground and remaining solvent again removed under vacuum. This is Thickener 3.

EXAMPLE 4 (PEO Amine 6000/$C_{16}$-ASA) (1:1) TDI

Random Hydrophobes

Polyethyleneglycoldiamine of average molecular weight 6000 (25 parts, 4.16 mM ex Kawaken FCC) and n-hexadecylsuccinic anhydride (1.35 parts, 4.16 mM ex TCI) were stirred together for 3 hours at 130° C. under nitrogen. The resulting polyether succinamide was cooled to 75° C. and toluene (55 parts) was added followed by dibutyltindilaurate (0.1 part ex Aldrich). A solution of tolylene-2,4-diisocyanate (0.54 parts, 3.12 mM ex Aldrich) dissolved in toluene (25 parts) was added dropwise with stirring at 75° C. and the reaction was continued by stirring at 75° C. for a further 3 hours under nitrogen when no free isocyanate could be detected. The reaction mix was cooled and the solvent removed under vacuum giving a yellow solid. This was ground and residual solvent removed under vacuum. This is Thickener 4.

EXAMPLE 5

Clustered Hydrophobes
a) PEO Amine 600/$C_{16}$-ASA (1:1) TDI

Polyethyleneglycol diamine of average molecular weight 600 (50 parts, 0.083M as Jeffamine ED600 ex Huntsman Corp) and n-hexadecylsuccinic anhydride (27.04 parts, 0.083M ex TCI) were stirred together for 3 hours at 130° C. under nitrogen. The resultant polyether succinamide was then cooled to 75° C. and dissolved in toluene (200 parts). Dibutyltindilaurate (0.2 parts ex Aldrich) was added followed by the dropwise addition of a solution of tolylene-2, 4-diisocyanate (10.84 parts, 0.065m ex Aldrich) in toluene (25 parts). The reaction was continued by stirring at 75° C. for a further 16 hours under nitrogen. Finally, propan-2-ol (20 ml) was added with stirring at 75° C. to destroy any residual isocyanate groups and the solvent was removed under vacuum. The polymer was obtained as an orange viscous oil. This is Intermediate 1.

b) Intermediate 1/PEG 12000/TDI

A solution of polyethyleneglycol of average molecular weight 12000 (75.84 parts, 6.32 mM) in toluene (240 parts) was added to Intermediate 1 (40 parts, 9.49 mM) with stirring at 95° C. under nitrogen. After 10 minutes, dibutyltindilaurate (0.3 parts) was added followed by the dropwise addition of a solution of tolylene-2,4-diisocyanate (2.2 parts, 0.0126M) in toluene (50 parts) over 10 minutes. The reaction was continued with stirring at 95° C. for 18 hours under nitrogen when no free isocyanate could be detected. The solvent was removed under vacuum to leave an orange/yellow oil. This is Thickener 5 which contains clusters of $C_{16}$-alkyl hydrophobes along the polymer backbone.

EXAMPLES 6 TO 10

The viscosity of a 5% solution of the Association thickener was measured using a TA Instruments $CSL^2$ Controlled Stress Rheometer at 20° C. equipped with a 4 cm plate at a 250µ. The results are given in Table 1 below.

TCI) were heated to 180° C. and N,N-dimethylamino pyridine (0.1 part ex Aldrich) was added with stirring under nitrogen. After 2 hours at 180° C., the reaction mass was cooled to 70° C. and toluene (150 ml) was added to give a clear solution followed by dibutyltindilaurate (0.1 parts ex Aldrich) and toluene-2,4-diisocyanate (0.66 parts, 0.0038M ex Aldrich). The reaction was continued by stirring for 3 hours at 70° C. under nitrogen. IR spectroscopy showed no isocyanate groups present. After cooling, the toluene was removed under vacuum to give an orange solid. This is Thickener 6.

EXAMPLES 12 TO 21

The thickeners in following Table 2 were prepared in similar manner to Thickener 6 of Example 11 except using the materials shown in the table.

TABLE 1

| Ex | Thickener | | | | | | | | | |
|---|---|---|---|---|---|---|---|---|---|---|
| Ex 6 | Thickener 1 | Shear rate (I/S) | 0.9768 | 11.54 | 117.9 | 169.2 | 301.8 | 583.2 | 1042 | 1960 |
| | | Viscosity (Pa · s) | 285.8 | 207.7 | 25.13 | 16.66 | 3.700 | 2.913 | 0.4790 | 0.3274 |
| Ex 7 | Thickener 2 | Shear rate (I/S) | 1.006 | 9.814 | 108.4 | 196.4 | 389.3 | 557.0 | 1020 | 1915 |
| | | Viscosity (Pa · s) | 23.14 | 22.34 | 6.944 | 4.991 | 2.064 | 1.355 | 0.8848 | 0.4918 |
| Ex 8 | Thickener 3 | Shear rate (I/S) | 1.101 | 10.77 | 105.0 | 201.3 | 385.5 | 534.0 | 1022 | 1966 |
| | | Viscosity (Pa · s) | 0.4651 | 0.2932 | 0.2027 | 0.1769 | 0.1362 | 0.1135 | 0.0770 | 0.0529 |
| Ex 9 | Thickener 4 | Shear rate (I/S) | 1.033 | 10.23 | 106.8 | 201.3 | 391.8 | 537.5 | 1027 | 1934 |
| | | Viscosity (Pa · s) | 19.97 | 15.90 | 3.972 | 2.744 | 1.451 | 1.042 | 0.5558 | 0.3066 |
| Ex 10 | Thickener 5 | Shear rate (I/S) | 1.076 | 10.79 | 105.0 | 201.3 | 385.6 | 533.8 | 1022 | 1968 |
| | | Viscosity (Pa · s) | 18.11 | 4.484 | 0.991 | 0.6257 | 0.3939 | 0.3130 | 0.2012 | 0.1331 |

EXAMPLE 11 PEG 8000/$C_{16}$-ASA (1:1) TDI-Isofol 20

Random Hydrophobes

Polyethylene glycol (24.65 parts, 0.003M, PEG 8000 ex Fluka) and hexadecyl succinic anhydride (1 part, 0.003M ex

EXAMPLES 22 TO 31

The viscosity of an aqueous solution of the Association thickeners listed in Table 3 was determined as described in Examples 6 to 10 at the concentrations indicated.

TABLE 2

| Example | Thickener | Diol/Diamine | Moles | ASA | Moles | Isocyanate | Moles | Alcohol/Amine | Mols | Thickener Type |
|---|---|---|---|---|---|---|---|---|---|---|
| 12 | 7 | PEG 8000 | 0.0028 | $C_{18}$-ASA | 0.0028 | TDI | 0.0034 | $C_{18}$-amine | 0.00089 | Random |
| 13 | 8 | PEG 1000/ PEG 200 (1:2) | 0.002 0.0041 | $C_{16}$-ASA | 0.0061 | TDI | 0.0067 | $C_{18}$-amine | 0.00084 | Random |
| 14 | 9 | PEG 12000 PEG 300 (3:2) | 0.0074 0.0049 | $C_{12}$-ASA | 0.0123 | TDI | 0.0827 | Isofol 20 | (0.25 g) | Random |
| 15 | 10 | PEG 8000 | 0.0031 | $C_{18}$-ASA | 0.0062 | TDI | 0.0062 | $H_2N-C_3-NH_2$ | 0.0031 | Clustered |
| 16 | 11 | PEG 8000 | 0.0031 | $C_{18}$-ASA | 0.0062 | TDI | 0.0062 | $HO-C_4-OH$ | 0.0031 | Clustered |
| 17 | 12 | Jeff ED 2001 | 0.099 | $C_{10}$-ASA | 0.099 | TDI | 0.1056 | Jeff ED 2001 | 0.0132 | Clustered |
| 18 | 13 | Jeff 600 | 0.083 | $C_{16}$-ASA | 0.083 | TDI | 0.0625 | Propanol | | Random |
| 19 | 14 | Jeff 600 | 0.083 | $C_{16}$-ASA | 0.083 | TDI | 0.0625 | PEG 12000 | 0.0063 | Clustered |

TABLE 2-continued

| Example | Thickener | Diol/Diamine | Moles | ASA | Moles | Isocyanate | Moles | Alcohol/Amine | Mols | Thickener Type |
|---|---|---|---|---|---|---|---|---|---|---|
| 20 | 15 | PEG 10000 | 0.02 | $C_{18}$-ASA | 0.02 | Desmodur L | 0.33 | $C_{18}$ | 0.02 | Random |
| 21 | 16 | Jeff ED 600 | 0.07 | $C_{12}$-ASA | 0.07 | TDI | 0.081 | PEG 10000 | 0.0116 | Clustered |

Footnote to Table 2
PEG - is polyethyleneglycol where the number following is molecular weight and in Examples 13 and 14, the ratio in parenthesis is the moles ratio of different PEGs.
Jeff - is Jeffamine ex Huntsman Corp.
ASA - is alkylsuccinic anhydride containing a saturated aliphatic chain as indicated eg $C_{18}$ (ex TCl). TDI is tolylene-2,4-diisocyanate ex Aldrich.

The number of carbon atoms in saturated aliphatic alcohols and amines is as indicated eg $C_{18}$-amine is octadecylamine.

$H_2N$—$C_3$—$NH_2$— is 1,3-diaminopropane ex Aldrich.
HO—$C_4$—OH— is 1,4-dihydroxybutane ex Aldrich.

TABLE 3

| Example | Thickener | | | | | | | | | |
|---|---|---|---|---|---|---|---|---|---|---|
| 22 | 6, 15% | Sheer Rate (I/S) | 0.9255 | 9.374 | 95.09 | 169.7 | 302.9 | 540.3 | 964.4 | — |
| | | Viscosity (Pa · s) | 4.845 | 4.709 | 4.782 | 4.268 | 3.330 | 2.265 | 1.389 | — |
| 23 | 7, 15% | Sheer Rate (I/S) | 0.9208 | 9.369 | 95.04 | 169.7 | 302.8 | 539.7 | 964.2 | 1288 |
| | | Viscosity (Pa · s) | 7.753 | 8.002 | 4.199 | 2.587 | 1.523 | 0.8875 | 0.5233 | 0.4071 |
| 24 | 8, 3.3% | Sheer Rate (I/S) | 0.9239 | 9.374 | 95.08 | 169.7 | 302.7 | 540.2 | 964.2 | 1288 |
| | | Viscosity (Pa · s) | 3.738 | 2.852 | 1.317 | 0.8310 | 0.5683 | 0.3510 | 0.1964 | 0.1466 |
| 25 | 9, 10% | Sheer Rate (I/S) | 0.9156 | 9.366 | 95.04 | 169.6 | 302.8 | 540.4 | 964.2 | 1288 |
| | | Viscosity (Pa · s) | 1.100 | 1.075 | 1.035 | 1.021 | 1.003 | 0.9629 | 0.9102 | 0.8748 |
| 26 | 10, 10% | Sheer Rate (I/S) | 0.9287 | 9.373 | 95.07 | 169.7 | 302.6 | 540.1 | 963.7 | 1289 |
| | | Viscosity (Pa · s) | 3.193 | 2.892 | 0.8856 | 0.5908 | 0.4588 | 0.3448 | 0.2446 | 0.2035 |
| 27 | 11, 3.3% | Sheer Rate (I/S) | 0.9178 | 9.382 | 93.80 | 169.3 | 304.3 | 540.5 | 964.1 | 1288 |
| | | Viscosity (Pa · s) | 14.49 | 4.425 | 1.406 | 0.7619 | 0.4223 | 0.3451 | 0.2812 | 0.2483 |
| 28 | 12, 15% | Sheer Rate (I/S) | 0.9263 | 9.368 | 95.05 | 169.7 | 302.7 | 540.3 | 964.2 | 1288 |
| | | Viscosity (Pa · s) | 0.7047 | 0.5176 | 0.3656 | 0.3391 | 0.3119 | 0.2846 | 0.2600 | 0.2483 |
| 29 | 14, 10% | Sheer Rate (I/S) | 0.9233 | 9.375 | 95.07 | 169.6 | 302.8 | 540.2 | 964.2 | 1288 |
| | | Viscosity (Pa · s) | 2.157 | 1.775 | 1.169 | 0.9136 | 0.6686 | 0.4690 | 0.3202 | 0.2629 |
| 30 | 15, 10% | Sheer Rate (I/S) | 0.9197 | 9.354 | 95.75 | 169.7 | 314.6 | 546.0 | 957.9 | — |
| | | Viscosity (Pa · s) | 22.88 | 23.77 | 5.253 | 2.031 | 0.9112 | 0.5148 | 0.2968 | — |
| 31 | 16, 10% | Sheer Rate (I/S) | 0.9222 | 9.371 | 94.99 | 169.6 | 302.6 | 540.0 | 965.0 | 1289 |
| | | Viscosity (Pa · s) | 5.270 | 4.236 | 3.093 | 2.775 | 2.444 | 2.058 | 1.665 | 1.448 |

What is claimed is:

1. A polymer comprising the addition reaction product of a polyisocyanate having a functionality of from 2 to 10 and a succinylpolyether having a $C_{6-30}$-alk(en)yl group and at least one group which is capable of reacting with the polyisocyanate.

2. A polymer as claimed in claim 1 wherein the polyether is derivable from ethylene oxide, propylene oxide, butyleneoxide or from polymerised tetrahydrofuran.

3. A polymer as claimed in either claim 1 or claim 2 wherein the number of recurring alkyleneoxy groups in the polyether is from 4 to 800.

4. A polymer as claimed in claim 1 or claim 2 wherein the polyether is a polyalkyleneglycol, a polyalkylene glycol mono alkyl ether, a polyalkylene glycol mono amine, a polyalkyleno glycol mono alkyl ether mono amine or a polyalkylene glycol diamine.

5. A polymer as claimed in claim 4 wherein the number of carbon atoms in the alkyl group of the polyalkyleneglycol mono alkyl ether or the polyalkyleneglycol mono alkyl ether mono amine is not greater than 30.

6. A polymer as claimed in claim 1 or claim 2 wherein the alk(en)yl group contains not less than 12 and not greater than 20 carbon atoms.

7. A polymer as claimed in claim 1 or claim 2 wherein the succinyl polyether is obtainable by reacting an alk(en)yl succinic anhydride with a polyether in stoichiometric amounts.

8. A polymer as claimed in claim 1 or claim 2 which contains hydroxy and/or amino groups which are subsequently reacted with additional diols, diamines or hydroxyamines in the presence of polyisocyanate.

9. A process for making a polymer as claimed in claim 1 or claim 2 which comprises reacting a succinyl polyether with a polyisocyanate in an inert atmosphere at a temperature from 40 to 100° C. optionally in the presence of an organic liquid and preferably in the presence of a catalyst.

10. A process as claimed in claim 9 wherein the catalyst is dibutyltindilaurate.

11. An aqueous system including therein, as an Association Thickener, a polymer as claimed in claim 1 or claim 2.

* * * * *